UNITED STATES PATENT OFFICE.

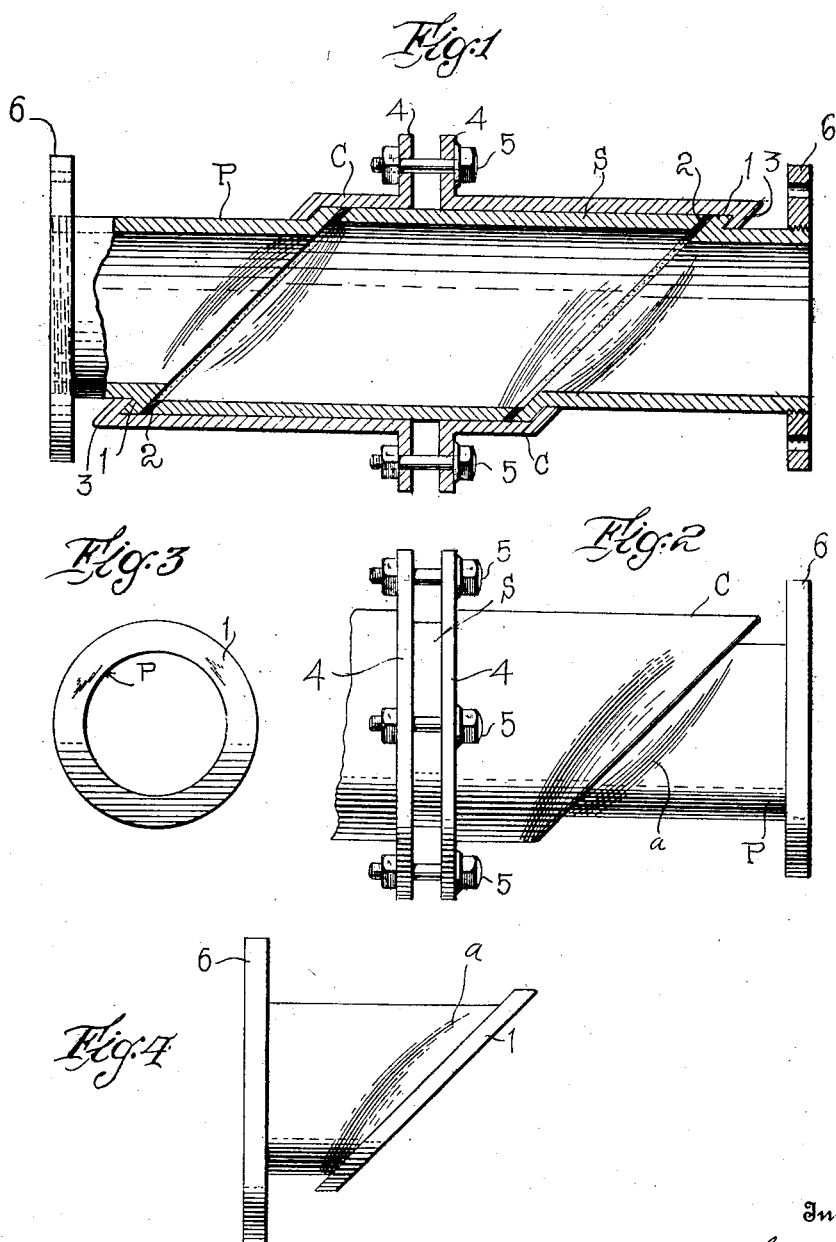

JOHN REIBAND, OF BALTIMORE, MARYLAND.

PIPE-COUPLING.

1,347,660.  Specification of Letters Patent.  Patented July 27, 1920.

Application filed September 6, 1919. Serial No. 322,098.

*To all whom it may concern:*

Be it known that I, JOHN REIBAND, a citizen of France, residing at Baltimore, State of Maryland, have invented certain new and useful Improvements in Pipe-Couplings, of which the following is a full, clear, and exact description, reference being had to the accompanying drawings.

This invention relates to certain improvements in pipe couplings, and it is the object of the invention to provide a novel and improved device of this general character whereby the desired coupling or connection may be attained with convenience and facility.

Another object of the invention is to provide a novel and improved device of this general character, wherein the coupling is substantially hermetic.

It is also an object of this invention to provide a novel and improved coupling of this general character consisting of two pipe lengths or sections having their opposed ends obliquely disposed with respect to their axes, and wherein a sleeve is interposed between said ends, together with means for clamping said pipe sections or lengths and interposed sleeve in assembled relation.

An additional object of the invention is to provide a novel and improved device of this general character including a pair of pipe lengths or sections having a sleeve interposed therebetween, together with means for maintaining said pipe sections or lengths and sleeve in assembled relation, and wherein the desired seal effected by the interposed pipe may be maintained and facilitated by relative rotation of either of the pipe sections or lengths and the interposed sleeve.

The invention consists in the details of construction and in the combination and arrangement of the several parts of my improved pipe coupling, whereby certain important advantages are attained and the device rendered simpler, less expensive and otherwise more convenient and advantageous for use, as will be hereinafter fully set forth.

The novel feature of my invention will hereafter be definitely claimed.

In order that my invention may be the better understood, I will now proceed to describe the same with reference to the accompanying drawings, wherein:

Figure 1 is a view partly in elevation and partly in section, illustrating a pipe coupling constructed in accordance with an embodiment of my invention.

Fig. 2 is a fragmentary view in side elevation of the device, as illustrated in Fig. 1.

Fig. 3 is a view in elevation of the inner end of one of the pipe sections or lengths, as herein included, and:

Fig. 4 is a view in side elevation of one of said pipe sections or lengths, as herein embodied.

As disclosed in the accompanying drawings, my improved pipe coupling comprises a pair of pipe sections or lengths P, having their inner or opposed ends obliquely inclined with respect to the axes thereof, and such angles of inclination are substantially 45° with respect to such axes.

The inner or obliquely inclined ends of each of the pipe lengths, or section P, are defined by outstanding continuous flange 1, and, in order that said flange may be annular, said end portion of the pipe section or length P, is outwardly bulged, as indicated at "$a$".

"S" denotes the sleeve inserted between the inner ends of the pipe sections or lengths P, and the opposite ends of said sleeve "S" are obliquely inclined, similar to the inner ends of said pipe sections or lengths. The ends of the sleeve "S" contact with a gasket 2, and which gasket also contacts with the flange 1.

C denotes a collar surrounding an end portion of the sleeve S, and having its outer end portion obliquely disposed with the angle of inclination substantially at 45° with respect to the axis thereof. Said outer or inclined end portion of the collar C is defined by the inwardly directed continuous flange 3, which overlies the inner face of the flange 1, of the adjacent pipe section or length.

As particularly illustrated in Fig. 1, a collar C coacts with each end portion of the sleeve S, and pipe section or length P. The collars C are substantially duplicate in construction, and have their inner or opposed ends defined by the outstanding continuous flanges 4, with which coact the holding members 5.

An effective seal may be had in my improved coupling through the instrumentality of the interposed sleeve S, and particularly when either of the pipe sections or lengths P are rotated, as by such movement the coacting flanges 1 and 3 coöperate as cam surfaces to effect the requisite pressure upon the sleeve C, and the gaskets 2 coacting therewith.

After the desired sealing of the coupling has been attained, the same is maintained by properly tightening the holding members 5. The outer end portion of each of the pipe sections or lengths P is adapted to be coupled in working position through the medium of the outstanding continuous flange 6. The flange 6, in the present embodiment of my invention is removable, so that the desired assembly of each of the pipe sections or lengths P with respect to its coacting collar C may be readily obtained.

From the foregoing description it is thought to be obvious that a pipe coupling constructed in accordance with an embodiment of my invention is particularly well adapted to use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown, in carrying out my invention in practice, except as hereinafter claimed.

I claim:

1. A pipe coupling comprising a pair of pipe lengths having their opposed ends obliquely disposed and defined by outstanding continuous flanges, a sleeve interposed between said ends of the pipe lengths, a collar surrounding each end portion of the sleeve, and means for connecting the opposed ends of the collars, the opposite end portion of each of the collars being obliquely disposed and defined by a continuous flange overlying the flange of the adjacent pipe length.

2. A pipe coupling comprising a pair of pipe lengths having their opposed ends obliquely disposed with respect to the axes thereof, and substantially defined by outstanding flanges, a sleeve interposed between said pipe lengths, collars loosely surrounding the opposite end portions of the sleeve, and having inwardly directed flanges overlying the flanges of the pipe lengths, and means for connecting said collars, the flanges of the collars coacting with the flanges of the pipe lengths for moving each of said pipe lengths toward the sleeve upon relative rotation of the pipe length and coacting collar one with respect to the other.

In testimony whereof I hereunto affix my signature.

JOHN REIBAND.